United States Patent
Ziauddin

(10) Patent No.: US 9,514,187 B2
(45) Date of Patent: Dec. 6, 2016

(54) TECHNIQUES FOR USING ZONE MAP INFORMATION FOR POST INDEX ACCESS PRUNING

(71) Applicant: Oracle International Corporation, Redwood Shores, CA (US)

(72) Inventor: Mohamed Ziauddin, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 214 days.

(21) Appl. No.: 14/245,934

(22) Filed: Apr. 4, 2014

(65) Prior Publication Data

US 2015/0286682 A1    Oct. 8, 2015

(51) Int. Cl.
G06F 17/30    (2006.01)

(52) U.S. Cl.
CPC ... *G06F 17/30486* (2013.01); *G06F 17/30339* (2013.01); *G06F 17/30463* (2013.01)

(58) Field of Classification Search
CPC ............... G06F 17/30486; G06F 17/30463; G06F 17/30339
See application file for complete search history.

(56) References Cited

U.S. PATENT DOCUMENTS

| | | | |
|---|---|---|---|
| 6,484,179 B1 | 11/2002 | Roccaforte | |
| 6,636,870 B2 | 10/2003 | Roccaforte | |
| 6,662,174 B2 | 12/2003 | Shah et al. | |
| 6,732,115 B2 | 5/2004 | Shah et al. | |
| 6,748,394 B2 | 6/2004 | Shah et al. | |
| 6,778,996 B2 | 8/2004 | Roccaforte | |
| 6,785,666 B1 | 8/2004 | Nareddy et al. | |
| 6,804,714 B1 | 10/2004 | Tummalapalli | |
| 6,865,575 B1 | 3/2005 | Smith et al. | |
| 6,898,608 B2 | 5/2005 | Hopeman et al. | |
| 6,920,460 B1 | 7/2005 | Srinivasan et al. | |
| 6,941,311 B2 | 9/2005 | Shah et al. | |
| 6,973,457 B1 | 12/2005 | Bastawala et al. | |
| 7,007,029 B1 | 2/2006 | Chen | |
| 7,028,046 B2 | 4/2006 | Anjur et al. | |
| 7,031,953 B2 | 4/2006 | Shah et al. | |
| 7,031,994 B2 | 4/2006 | Lao et al. | |

(Continued)

OTHER PUBLICATIONS

Bhattacharjee et al., "Efficient Query Processing for Multi-Dimensionally Cluster Tables in DB2", Proceedings 2003 VLDB Conference, Jan. 1, 2013, pp. 1-12.*

(Continued)

*Primary Examiner* — Rehana Perveen
*Assistant Examiner* — Alexander Khong
(74) *Attorney, Agent, or Firm* — Hickman Palermo Becker Bingham LLP; Adam C. Stone

(57) ABSTRACT

Techniques for using zone map information for post index access pruning. In one embodiment, for example, a method for using zone map information for post index access pruning comprises: receiving a query statement comprising a first filter predicate on an indexed column of a database table and a second filter predicate on a zoned column of a database table; identifying zero or more pruneable zones of a zone map based on a value for the zoned column in the second filter predicate; obtaining a set of data record addresses from an index on the indexed column based on a value for the indexed column in the first filter predicate; and pruning, from access paths for processing the query statement, any data records, corresponding to data record addresses in the set of data record addresses, that are physically located in one of the pruneable zones.

23 Claims, 8 Drawing Sheets

(56) References Cited

U.S. PATENT DOCUMENTS

| | | | |
|---|---|---|---|
| 7,072,897 B2 | 7/2006 | Shah et al. |
| 7,076,507 B1 | 7/2006 | Tarin |
| 7,080,090 B2 | 7/2006 | Shah et al. |
| 7,089,331 B1 | 8/2006 | Gollapudi et al. |
| 7,093,194 B2 | 8/2006 | Nelson |
| 7,103,590 B1 | 9/2006 | Murthy et al. |
| 7,133,951 B1 | 11/2006 | Bourekas |
| 7,143,098 B2 | 11/2006 | Chen et al. |
| 7,167,859 B2 | 1/2007 | Shah et al. |
| 7,228,300 B2 | 6/2007 | Lei et al. |
| 7,233,952 B1 | 6/2007 | Chen |
| 7,287,022 B2 | 10/2007 | Netz et al. |
| 7,313,559 B2 | 12/2007 | Netz et al. |
| 7,315,849 B2 | 1/2008 | Bakalash et al. |
| 7,320,001 B1 | 1/2008 | Chen |
| 7,333,982 B2 | 2/2008 | Bakalash et al. |
| 7,346,617 B2 | 3/2008 | Wong |
| 7,366,730 B2 | 4/2008 | Greenfield et al. |
| 7,373,353 B2 | 5/2008 | Adler et al. |
| 7,379,944 B2 | 5/2008 | Adler et al. |
| 7,383,275 B2 | 6/2008 | Chen et al. |
| 7,389,283 B2 | 6/2008 | Adler |
| 7,389,284 B1 | 6/2008 | Surlaker et al. |
| 7,392,248 B2 | 6/2008 | Bakalash et al. |
| 7,415,457 B2 | 8/2008 | Dombroski et al. |
| 7,418,438 B2 | 8/2008 | Gould et al. |
| 7,433,886 B2 | 10/2008 | Rathakrishnan |
| 7,437,372 B2 | 10/2008 | Chen et al. |
| 7,480,662 B2 | 1/2009 | Postapov et al. |
| 7,480,663 B2 | 1/2009 | Colossi et al. |
| 7,496,589 B1 | 2/2009 | Jain et al. |
| 7,502,894 B2 | 3/2009 | Luo |
| 7,505,888 B2 | 3/2009 | Legault et al. |
| 7,558,779 B2 | 7/2009 | Luo |
| 7,593,955 B2 | 9/2009 | Legault et al. |
| 7,610,300 B2 | 10/2009 | Legault et al. |
| 7,610,351 B1 | 10/2009 | Gollaapudi et al. |
| 7,617,235 B2 | 11/2009 | Srinivasan et al. |
| 7,617,312 B2 | 11/2009 | Tummalapalli |
| 7,657,503 B1 | 2/2010 | Cormode et al. |
| 7,657,516 B2 | 2/2010 | Zaman et al. |
| 7,660,823 B2 | 2/2010 | Clover |
| 7,685,092 B2 | 3/2010 | Reichert et al. |
| 7,689,621 B1 | 3/2010 | Huber et al. |
| 7,707,143 B2 | 4/2010 | Bruce et al. |
| 7,716,167 B2 | 5/2010 | Colossi et al. |
| 7,716,172 B2 | 5/2010 | Anjur et al. |
| 7,765,246 B2 | 7/2010 | Basu et al. |
| 7,769,733 B2 | 8/2010 | Chen et al. |
| 7,774,379 B2 | 8/2010 | Basu et al. |
| 7,779,038 B2 | 8/2010 | Adler et al. |
| 7,814,104 B2 | 10/2010 | Raghavan et al. |
| 7,831,615 B2 | 11/2010 | Bailey |
| 7,836,082 B2 | 11/2010 | Adler et al. |
| 7,860,891 B2 | 12/2010 | Adler et al. |
| 7,873,664 B2 | 1/2011 | Andersch et al. |
| 7,873,684 B2 | 1/2011 | Souder et al. |
| 7,890,546 B2 | 2/2011 | Shah et al. |
| 7,895,191 B2 | 2/2011 | Colossi et al. |
| 7,904,327 B2 | 3/2011 | Phelan et al. |
| 7,930,200 B1 | 4/2011 | McGuirtk et al. |
| 7,949,674 B2 | 5/2011 | Middelfart |
| 7,966,322 B2 | 6/2011 | Clover |
| 7,966,330 B2 | 6/2011 | Raghavan et al. |
| 7,979,425 B2 | 7/2011 | Garg et al. |
| 7,996,378 B2 | 8/2011 | Wang et al. |
| 8,000,996 B1 | 8/2011 | Sanli et al. |
| 8,001,112 B2 | 8/2011 | Dombroski |
| 8,041,670 B2 | 10/2011 | Bakalash et al. |
| 8,051,102 B2 | 11/2011 | Everett |
| 8,065,262 B2 | 11/2011 | Bailey |
| 8,082,239 B2 | 12/2011 | Yang et al. |
| 8,126,871 B2 | 2/2012 | Malloy et al. |
| 8,131,533 B2 | 3/2012 | Legault et al. |
| 8,135,688 B2 | 3/2012 | Shankar et al. |
| 8,150,850 B2 | 4/2012 | Herrnstadt |
| 8,160,917 B1 | 4/2012 | Solanki et al. |
| 8,161,085 B2 | 4/2012 | Souder et al. |
| 8,170,984 B2 | 5/2012 | Bakalash et al. |
| 8,195,602 B2 | 6/2012 | Bakalash et al. |
| 8,195,645 B2 | 6/2012 | Thiebaut-George |
| 8,200,612 B2 | 6/2012 | Soylemez et al. |
| 8,209,280 B2 | 6/2012 | Kearney et al. |
| 8,209,294 B2 | 6/2012 | Shankar et al. |
| 8,832,142 B2 | 9/2014 | Marwah et al. |
| 2002/0095421 A1 | 7/2002 | Koskas |
| 2003/0126143 A1 | 7/2003 | Roussopoulos |
| 2003/0195898 A1 | 10/2003 | Agarwal et al. |
| 2004/0153435 A1 | 8/2004 | Gudbjartsson et al. |
| 2004/0177065 A1 | 9/2004 | Tropf |
| 2005/0004936 A1 | 1/2005 | Potapov |
| 2005/0038784 A1 | 2/2005 | Zait |
| 2005/0044102 A1 | 2/2005 | Gupta et al. |
| 2005/0102467 A1 | 5/2005 | Lam et al. |
| 2006/0253429 A1* | 11/2006 | Raghavan ......... G06F 17/30492 |
| 2007/0041718 A1 | 2/2007 | Fontijn |
| 2007/0061287 A1 | 3/2007 | Le et al. |
| 2007/0078813 A1* | 4/2007 | Beavin ............. G06F 17/30454 |
| 2008/0059408 A1 | 3/2008 | Barsness |
| 2010/0235344 A1* | 9/2010 | Chandrasekar ... G06F 17/30935 |
| | | | 707/713 |
| 2010/0235348 A1 | 9/2010 | Baby |
| 2010/0257181 A1 | 10/2010 | Zhou |
| 2010/0281017 A1* | 11/2010 | Hu .................... G06F 17/30477 |
| | | | 707/718 |
| 2012/0109888 A1 | 5/2012 | Zhang |
| 2012/0117054 A1* | 5/2012 | Shrinivas .......... G06F 17/30469 |
| | | | 707/713 |
| 2012/0290588 A1* | 11/2012 | Egan ................ G06F 17/30339 |
| | | | 707/752 |
| 2013/0151491 A1 | 6/2013 | Gislason |
| 2013/0198165 A1 | 8/2013 | Cheng |

OTHER PUBLICATIONS

U.S. Appl. No. 13/629,907, filed Sep. 28, 2012, Notice of Allowance, Dec. 1, 2014.

U.S. Appl. No. 13/629,897, filed Sep. 28, 2012, Final Office Action, Jan. 4, 2016.

Abadi, D. et al., "Column-Stores vs. Row-Stores: How Different Are They Really?" *Sigmod* 2008(14 pages).

Dijcks, Jean-Pierre, "A Not So fabulous New Release (The Data Warehouse Insider)", dated Aug. 30, 2009, 9 pages.

Netezza Database Software Technology, "A partial Overview of Netzza Database Software Technology", dated Jun. 21, 2010, 12 pages.

Ronthal, Adam, "Appliances Are Easy to Use", Blog, dated Mar. 27, 2012, 3 pages.

Snow, Dwaine, "FUD Competitors are Spreading on Netezza", dated Jun. 28, 2012, 3 pages.

Howard, Philip, "Netezza: More Than You Might Imagine", Bloor Research, dated Oct. 3, 2006, 6 pages.

DB Technology, "Netezza Questions and Answers", dated Aug. 2, 2009, 5 pages.

DBMS 2: DataBase Management System Services, "Netezza vs. Conventional Data Warehousing RDBMS", dated Sep. 20, 2006, 8 pages.

Big Data Topics, "Using nz_Zonemap to Visualize Netezza's Zone Map Effectiveness", dated Jul. 20, 2012, 5 pages.

NZGuv, Netezza Tips, Tricks and Cool SQL, "With Netezza Always Use Integer Join Keys for Good Compression, Zone Maps, and Joins" dated Nov. 20, 2010, 1 page.

Birmingham, David, "Netezza Underground", "Zone Maps and Data Power", dated Jul. 11, 2011, 5 pages.

Oracle, "Oracle7 Server Concepts", Release 7.3, dated Feb. 1996, 178 pages.

O'Neil et al., "The Star Schema Benchmark and Augmented fact Table Indexing", dated Aug. 24, 2009, 16 pages.

IBM, "Best Practices Physical Database Design for Data Warehouse Environments", dated 2012, 70 pages.

(56) References Cited

OTHER PUBLICATIONS

IBM DB2 Universal Database, "Administration Guide: Planning", IBM, dated Jan. 1, 2004, 102 pages.
Chen et al., "Adjoined Dimension Colum Clustering to Improve Data Warehouse Query Performance", data engineering, dated 2008, IEEE, 4 pages.
Bhattacharjee et al., "Efficient Query Processing for Multi-Dimensionally Clustered Tables in DB2", Proceedings 2003 VLDB Conference, dated Jan. 1, 2003, 12 pages.
U.S. Appl. No. 13/629,907, filed Sep. 28, 2012, Office Action, May 22, 2014.
U.S. Appl. No. 13/629,897, filed Sep. 28, 2012, Office Action, Oct. 5, 2015.
Ailamaki, Anastassia, et al, "Weaving Relations for Cache Performance," Proceedings of the 27$^{th}$ International Conference on Very Large Data Bases, Rome, Italy, Sep. 11-14, 2001, 14 pages.
Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).
Brirningham, "Zone Maps and Data Power", IBM Netezza Underground Blogs, dated Jul. 11, 2011, 7 pages.

\* cited by examiner

TECHNIQUES FOR USING ZONE MAP INFORMATION FOR POST INDEX ACCESS PRUNING

CROSS-REFERENCE TO RELATED APPLICATIONS

This application is related to the following application(s): U.S. application Ser. No. 13/629,897, filed Sep. 28, 2012, entitled "CLUSTERING A TABLE IN A RELATIONAL DATABASE MANAGEMENT SYSTEM" and U.S. application Ser. No. 13/629,907, filed Sep. 28, 2012, entitled "PRUNING DISK BLOCKS OF A CLUSTERED TABLE IN A RELATIONAL DATABASE MANAGEMENT SYSTEM". The disclosure of each of the foregoing applications is hereby incorporated by reference in its entirety, including any appendices or attachments thereof, for all purposes.

FIELD OF THE INVENTION

The present invention relates generally to data processing environments and, more particularly, to a database computer system implementing techniques for using zone map information for post index access pruning.

BACKGROUND

Computers are powerful tools for storing and accessing vast amounts of information. Computer databases are a common mechanism for storing information on computer systems. A typical database is an organized collection of related information stored as "records" having "fields" of information. As an example, a database of sales may have a record for each sale where each record contains fields designating specifics about the sale, such as identifier, price, shipping address, order date, ship date, etc.

Between the actual physical database itself (i.e., the data actually stored on a storage device) and the users of the system, a database management system or DBMS is typically provided as a software intermediary or layer. Typically, all requests from users to access database data are processed by the DBMS. For example, information may be added or removed from data files, information retrieved from or updated in such files, and so forth.

A fundamental challenge in designing any DBMS is to provide the ability to users to quickly select a small subset of a large volume of database data. For example, a manager of a chain of retail stores may be interested in selecting information about sales that occurred on a particular date in a particular one of the stores from among historical sales data collected from all of the retail stores over the past five years. Typically, approaches for improving the performance of highly selective database queries include adding additional indexes on selected fields.

A database index allows the records to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers (e.g., RIDs). The record numbers are unique addresses of (pointers to) the actual storage location of each record in the database file.

More recently, approaches for improving the performance of highly selective database queries include clustering and using zone maps. Clustering refers to storing related data of a table in a sorted order in contiguous on-disk data blocks. A zone maps is then added to index the clustered data as stored on-disk. Specifically, the zone map divides the clustered data into contiguous on-disk "regions" or "zones" of contiguous disk blocks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Computer-implemented techniques for using zone map information for post index access pruning are disclosed. The claims section at the end of this document provides a useful summary of some embodiments of the present invention.

DETAILED DESCRIPTION

Glossary

Figure 1:
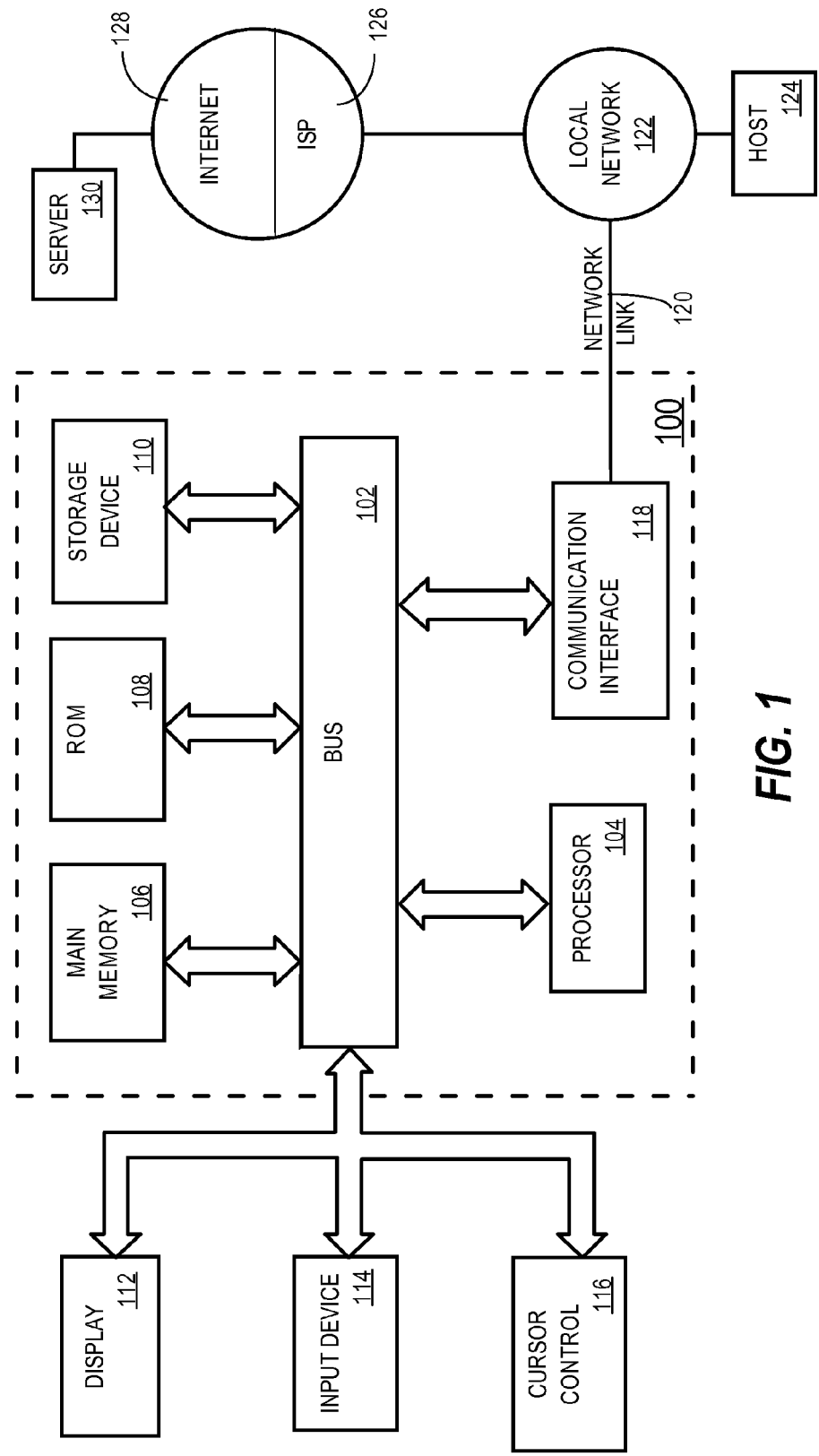
FIG. 1 is a block diagram of a computer system in which some embodiments of the present invention may be implemented.

The following definitions are offered for purposes of illustration, not limitation, in order to assist with understand the discussion that follows.

Access path—The term access path is used to refer generally to an interface between the query engine and the storage layer of a DBMS.

Data block—Sometimes referred to as a logical block, a block, or a page. A data block corresponds to an enumerated number of contiguous bytes within an address space (an address space may be logical or physical) within persistent memory, such as disk storage or flash disk.

Data record address—Also referred to as a row identifier or just ROWID. A data record address is a unique physical address of a data record in a database. Index scans often return a set of data record addresses of data records that satisfy indexed field values.

DBMS—The term DBMS refers to a database management system.

Column—A vertical space in a table that represents a domain of data. A table definition may include a name and a set of one or more columns. Each of the columns may have a name and a data type.

Execution plan—Sometimes referred to as a query plan. An execution plan is the combination of steps used by a DBMS to execute a query.

Extent—A level of logical database storage space above a data block. An extent is a specific number of data blocks within a contiguous address space allocated for storing a specific type of information.

Index—An optional schema object associated with a table. In some cases, indexes speed access to table data.

Query—An operation that retrieves data from tables or views. For example, SELECT*FROM employees is a statement that expresses a query operation for retrieving data from table "employees".

Query engine—A component of a DBMS, which typically includes, among other possible components, a parser, an optimizer, and an execution engine. The parser converts the text of a query into a query tree and imposes syntactic correctness. The optimizer chooses the most efficient means of executing the query. The execution engine carries out an execution plan for executing the query.

Query execution—Sometimes referred to as query processing. Query execution includes all phases of query evaluation including parsing, optimization, execution, and result generation.

Row—A set of columns information corresponds to a single record in a table. Rows may be stored in data blocks.

Schema—A named collection of database objects, including logical structures such as tables and indexes.

Schema object—A logical structure of data stored in a schema. Examples of schema objects are tables and indexes.

Segment—A level of logical database storage space above a data block. A segment is a set of extents or a set of data blocks, each of which has been allocated for a specific data structure. For example, data of a table or an index may be stored in its own segment.

SQL—Stands for Structured Query Language. SQL is a well-known nonprocedural language to access a relational database.

Storage layer—Refers to the component of a DBMS providing services to the query engine such as running disk scans, reading data from disk into memory buffers, storing data from memory buffers to disk, and other disk operations.

Table—A unit of storage in a database. Data in tables is stored in rows and columns.

Introduction

Referring to the figures, exemplary embodiments of the invention will now be described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. The exemplary embodiments are primarily described with reference to block diagrams of flowcharts. As to the flowcharts, each block within the flowcharts represents both a method step and an apparatus element for performing the method step. Depending upon the requirements of the particular implementation at hand, the corresponding apparatus element may be configured in hardware, software, firmware, or combinations thereof.

Overview

Embodiments of the present invention provide a query engine for more efficient processing of queries with at least one filter predicate on at least one indexed column and at least one filter predicate on a zoned column. Here, an indexed column is a column of a table on which an index has been built and a zoned column is a column of a table on which a zone map has been constructed. The query engine provides for improved processing of such queries by pruning the set of row identifiers returned from an index scan or probe. The query engine determines, for a given row identifier in the set, based on the zone map information for the zoned column, whether the zone in which the identified row is stored contains table data that can possibly satisfy the filter predicate in the query on the zoned column. If not, then the row identifier can be pruned from the post index access paths for processing the query. With this approach, the set of row identifiers returned from the index scan or probe can be reduced (pruned). Consequently, the amount of disk access for processing the query is potentially reduced because potentially fewer data blocks corresponding to the remaining row identifiers in the set need be read into memory from disk. Reading data blocks from disk for a set of row identifiers returned from an index scan can involve a significant amount of random disk access. By pruning the set of row identifiers returned from an index scan, the disk I/O savings from the approach of the present invention can be substantial. Disk, as the term is used herein, refers to any non-volatile data storage or persistent data storage including, but not limited to, a hard disk, flash memory, a solid state disk, or an electronic disk.

As one example of using zone map information as a post index access filter on returned row identifiers, consider the following SQL query containing two filter predicates:

SELECT SUM(quantity_sold) FROM sales WHERE (cust_id=1000) AND (order_date BETWEEN '2013-11-01' AND '2013-11-30')

Further assume that the values of the cust_id column are indexed, the data of the sales table is clustered by the values of the order_date column, and a zone map has been created based on the values of the order_date column. A query engine optimizer calculating a cost of executing the above query may compare the costs of at least two different access plans for retrieving the requested data from the sales table. In one access plan, the optimizer may calculate the cost of performing a sequential table scan of the sales table with zone map pruning based on the BETWEEN predicate on the order_date column. In a second access plan, the optimizer may calculate the cost of performing an index scan of the index on the cust_id column based on the equality predicate on the cust_id column followed by random disk access of table rows using the row identifiers fetched from the index scan. According to embodiments of the present invention, the cost of the second access plan can be reduced by reducing (pruning) the number of row identifiers for which random disk access of table rows is required. For example, according to embodiments of the present invention, the second access plan can be modified to perform an index scan of the index on the cust_id column based on the equality predicate on the cust_id column, just as before, but now followed by the use of zone map information available for the order_date column to prune unneeded row identifiers returned from the index scan based on the BETWEEN predicate on the order_date column, followed by random disk access of table rows using the remaining unpruned row identifiers fetched from the index scan. According to embodiments of the present invention, a large number of row identifiers can be pruned, thereby avoiding a large number of random disk accesses.

In the above example, row identifier pruning is performed based on one filter predicate in the query on one zoned column. In particular, row identifier pruning is performed based on the BETWEEN predicate on the order_date column. In other embodiments, row identifier pruning is performed based on multiple filter predicates in a query on different zoned columns. Thus, the row identifier pruning approach of the present invention can be based on multiple filter predicates where each predicate is possibly on a different zoned column.

While in the above example the filter predicate on the zoned column is a range predicate, the filter predicate on the zoned column is an equality predicate, an inequality predicate, a like predicate with a constant prefix (e.g. like 'Men %'), or in-list predicate in other embodiments.

In contrast to embodiments of the present invention, an approach that reads all disk blocks for all row identifiers returned by the index scan or probe is sub-optimal. As mentioned, reading disk blocks can result in a significant amount of expensive random access disk I/O. In many cases, with an approach that reads all disk blocks for all row identifiers returned by the index scan, a large number of rows are read from disk into memory only to be immediately discarded upon determining that the rows do not satisfy other predicates in the query, resulting in wasteful disk I/O. Consequently, an approach that reads all disk blocks for all row identifiers returned by the index scan, the "retention rate" of data blocks read from disk for rows identified by results of an index scan or probe can be low. According to some embodiments, the query engine of the present invention increases this retention rate by attempting to read from disk only those rows identified by an index scan or probe that have not been pruned based on zone map information. Applications of the row identifier pruning techniques described herein include, but are not limited to, online transaction processing (OLTP), enterprise resource planning (ERP), and business analytic applications.

General-Purpose Computer System

In some embodiments, the present invention is implemented on a conventional or general-purpose computer system. For example, FIG. 1 is a block diagram that illustrates a computer system 100 in which some embodiments of the present invention may be embodied. Computer system 100 includes a bus 102 or other communication mechanism for communicating information, and a hardware processor 104 coupled with bus 102 for processing information. Hardware processor 104 may be, for example, a general purpose microprocessor or a system on a chip (SoC).

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104.

A storage device 110, such as a magnetic disk, optical disk, or solid-state drive is provided and coupled to bus 102 for storing information and instructions.

Computer system 100 may be coupled via bus 102 to a display 112, such as a liquid crystal display (LCD) or other electronic visual display, for displaying information to a computer user. Display 112 may also be a touch-sensitive display for communicating touch gesture (e.g., finger or stylus) input to processor 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 may implement the techniques described herein using customized hard-wired logic, one or more application-specific integrated circuits (ASICs), one or more field-programmable gate arrays (FPGAs), firmware, or program logic which, in combination with the computer system, causes or programs computer system 100 to be a special-purpose machine. According to some embodiments, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid-state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

A software system is typically provided for controlling the operating of computer system 100. The software system, which is usually stored in main memory 106 and on fixed storage (e.g., hard disk) 110, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, or LINUX.

One or more application(s), such as client software or "programs" or set of processor-executable instructions, may also be provided for execution by computer 100. The application(s) may be "loaded" into main memory 106 from storage 110 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computer system in accordance with instructions from OS and/or application(s). The graphical user interface also serves to display the results of operation from the OS and application(s).

Database Management System

Figure 2:
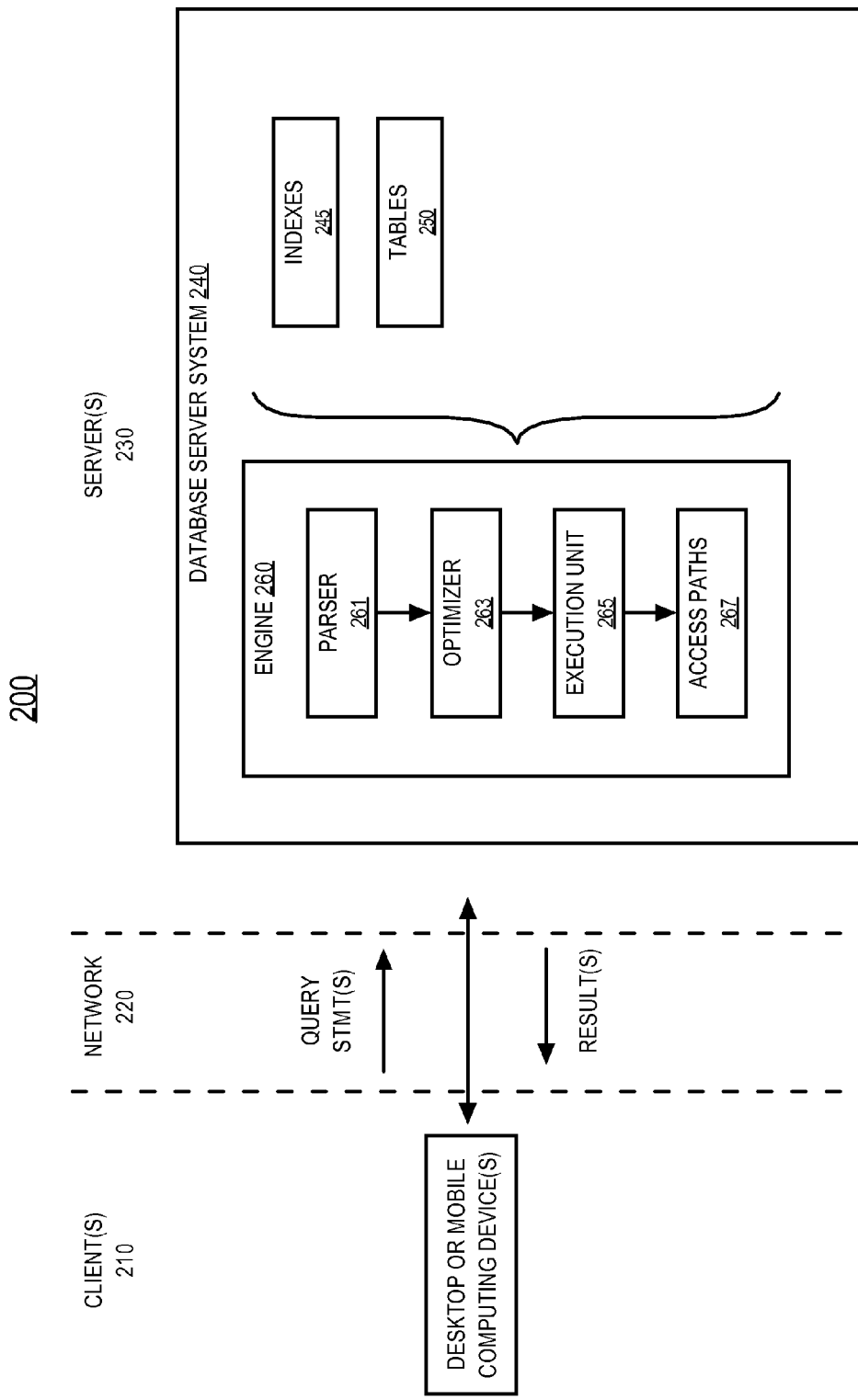
FIG. 2 illustrates general structure of a client/server database system suitable for implementing some embodiments of the present invention.

In some embodiments, the techniques of the present invention are embodied in a client/server database system. FIG. 2 illustrates general structure of a client/server database system 200 suitable for implementing some embodiments of the present invention. As shown, system 200 comprises one or more client(s) 210 connected to a server 230 via a network 220. Specifically, client(s) 210 comprise one or more computing devices 211 connected to a database server system 240 using a conventional network. In some embodiments, the computing devices 211 include one or more desktop computing devices and/or mobile computing devices. Typically, such computing devices would operate under a conventional operating system such as, for example, MICROSOFT WINDOWS, LINUX, UNIX, IOS, or ANDROID.

Database server system 240, which comprises ORACLE DATABASE (available from Oracle International Corporation of Redwood Shores, Calif.) in an exemplary embodiment, generally operates as a process or set of processes independent of the clients, running under a server operating system such as MICROSOFT WINDOWS, LINUX, or SUN SOLARIS.

Network 220 may comprise one or more wired or wireless conventional network systems, including a local area network (LAN), a wireless local area network (Wireless LAN), a Wide Area Network (WAN), and/or the Internet, as is known the art. Network 220 includes functionality for packing client network calls in the well-known structured query language (SQL) together with any parameter information into a format of one or more packets suitable for transmission to database server system 240.

In operation, client(s) 210 store data in or retrieve data from one or more database tables 250, as shown in FIG. 2. Data in a relational database is stored as a series of tables, also called relations. Typically resident on the server 230, each table itself comprises one or more "rows" or "records" (tuples). A typical database will contain many tables, each of which stores information about a particular type of entity. A table in a typical relational database may contain anywhere from a few rows to millions of rows or more. A row is divided into fields or columns; each field represents one particular attribute of the given row. A row corresponding to a sales record, for example, may include information about the sale's ID Number, Price, Shipping Address, Ship Date, and Order Date. Each of these categories, in turn, represents a database field. In the foregoing example sales table, for example, Shipping Address is one field, Ship Date is another, and so on. Each row in a table is uniquely identified by a Row ID (RID), which can be used as a pointer to a given row.

Database server system 240 may implement a database language, such as a variant of the Structured Query Language (SQL). A database language allows users and administrators to issue commands to create, manipulate, and access data stored in a relational database. Sometimes, database language statements are divided into two categories: data manipulation language (DML) statements, used to read and write data, and data definition language (DDL) statements, used to describe data and maintain the database. DML statements are also called query statements. In operation, for example, clients 210 issue one or more database language commands to server 230. Database language commands may specify, for instance, a query statement for retrieving particular data (e.g., data records meeting the query condition) from database table(s) 250. In addition to retrieving the data from database server table(s) 250, clients 210 also have the ability to issue commands to insert new rows of data records into the table(s), or to update and/or delete existing records in the table(s). Table(s) 250 may comprise materialized views, which is a schema object that stores a query result.

Database language statements are parsed to determine an "execution plan", which is the combination of steps used by the database system to execute a database language statement. In operation, database language statements received from client(s) 210 via network 220 are processed by engine 260 of database server system 240. Engine 260 comprises parser 261, optimizer 263, execution unit 265, and access paths 267. Specifically, the database language statements are passed to the parser 261 which converts the statements into a query tree—a tree data structure which represents components of the query in a format selected for the convenience of the system. In this regard, parser 261 may employ conventional parsing methodology (e.g., recursive descent parsing). Parser 261, or engine 260 generally, may normalize the query tree. Such normalization may include, for example, eliminating redundant data, error checking, or satisfying referential integrity constraints.

The normalized query tree is then passed to optimizer 263. Optimizer 263 is responsible for determining the most efficient way to execute the query considering factors affecting execution performance such as, for example, objects referenced and the conditions specified in the query. Typically, optimizer 263 performs a cost-based analysis for formulating a query execution plan. Such cost-based analysis may include, for example, selecting the join order of tables (e.g., when the query specifies a join) and selecting relevant indexes when available. Optimizer 263, therefore, performs an analysis of the query and selects the best execution plan, which in turn results in particular access paths 267 being invoked during query execution. It is possible that a given query may be answered by tens of thousands or more of access paths 267 with widely varying costs characteristics. General access paths include, but are not limited to, a full table scan (e.g., a scan of table data in which the database sequentially reads all rows from a table and filters out those that do not meet selection criteria) and an index scan (e.g., the retrieval of rows by traversing an index using the indexed column values specified in the query). Therefore, optimizer 263 must efficiently select an access path that is reasonably close to an optimal plan. Execution unit 265 translates the query execution plan selected by optimizer 263 into executable form for execution using access paths 267.

Server 230 may maintain one or more indexes 245 on tables 250 for enhancing storage, retrieval, and processing of data records.

The above-described computer hardware and software are presented for purposes of illustrating the basic underlying client and server computer components that may be employed for implementing some embodiments of the present invention. For purposes of discussion, the description herein presents examples in which it is assumed that there exists a "server" (e.g., database server) that communicates with one or more "clients" (e.g., personal computers or mobile devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the techniques of the present invention presented herein.

Clustering

Data (rows) of a table for which a zone map is constructed may be clustered. In the context of storing data in a DBMS, the organization of related table data in contiguous data blocks may be referred to as "clustering". Clustering can improve performance of table scans during query processing because the table data can be scanned with sequential disk access, as opposed to random disk access which is typically slower than sequential disk access.

There are a variety of different approaches to clustering table data in a DBMS. In one approach, rows of the table are stored on-disk in a linear order based on values of one or more columns. For example, rows of the table can be ordered by a query with an ORDER BY clause specifying one or more columns of the table and the rows stored in their sorted order on-disk in one or more contiguous data blocks. In another approach, table data is clustered along multiple dimensions based on values in columns of the table according to a space filing curve such as a Z-order or Hilbert space filing curve. In yet another approach, table data is clustered based on values of one or more columns of one or more other tables, in addition to or instead of columns of the clustered table. For example, rows of a fact table of a star schema can be clustered based on values from one or more columns of one or more dimension tables, in addition to or instead of columns of the fact table. To do this, rows from the fact table can be joined with rows from the dimension tables and the joined rows sorted, either in a linear order in a space filing curve order, based on values of columns of the dimension tables, in addition to or instead of values of columns of the fact table. The rows of the fact table are then stored in contiguous data blocks on disk in the sorted order. Approaches for clustering rows of a fact table based on value of columns of dimension tables are described in detail in related U.S. application Ser. No. 13/629,897, filed Sep. 28, 2012, entitled "Clustering A Table In A Relational Database Management System", the entire contents of which is hereby incorporated by reference as if fully set forth herein.

Zone Maps

Zone maps can be constructed by a DBMS on table data, which may be clustered. A zone map is a database access structure that allows the DBMS to skip disk scans of certain data blocks of a table when scanning the table data because it is known, based on the zone map, that the skipped data blocks cannot contain data relevant to the query for which the table scanning is being performed.

Generating a zone map for a table typically involves the DBMS dividing the contiguous data blocks of the clustered table data into sets of contiguous data blocks called "zones". For each zone, the minimum and maximum values of interesting columns are determined. The interesting columns can be one or more columns of the table for which the zone map is being generated (e.g., columns of a fact table) and/or columns of other tables (e.g., columns of dimension tables).

A table for which a zone map has been generated is referred to hereinafter as a "zoned table". The "interesting" columns that a zone map maintains minimum and maximum values for are referred to hereinafter as the "zoned columns". The zoned columns do not have to be, but can be, columns of the zoned table. In the case where some of the zoned columns are not columns of the zoned table (e.g., where some of the zoned columns are columns of dimension tables), it is typically expected that the table data of zoned table has been clustered on-disk according to values of the zoned columns. For example, techniques for pruning data blocks of a clustered fact table using zone maps built on values of columns of dimension tables is described in greater detail in related U.S. application Ser. No. 13/629,907, filed Sep. 28, 2012, entitled "Pruning Disk Blocks Of A Clustered Table In A Relational Database Management System", the entire contents of which is hereby incorporated by reference as if fully set forth herein.

When the query engine executes a query that qualifies one of the zoned columns with a filter predicate, the database server can compare the value (or the range of possible values) of the zoned column in the filter predicate to the minimum value and the maximum value of the zoned column for a zone to determine whether the zone can possibly contain data satisfying the filter predicate. If the zone cannot possibility satisfy the filter predicate, then the data blocks of the zone may be skipped during a table scan of the zoned table. Skipping data blocks using zone maps in this way is referred to a zone pruning.

Figure 3:
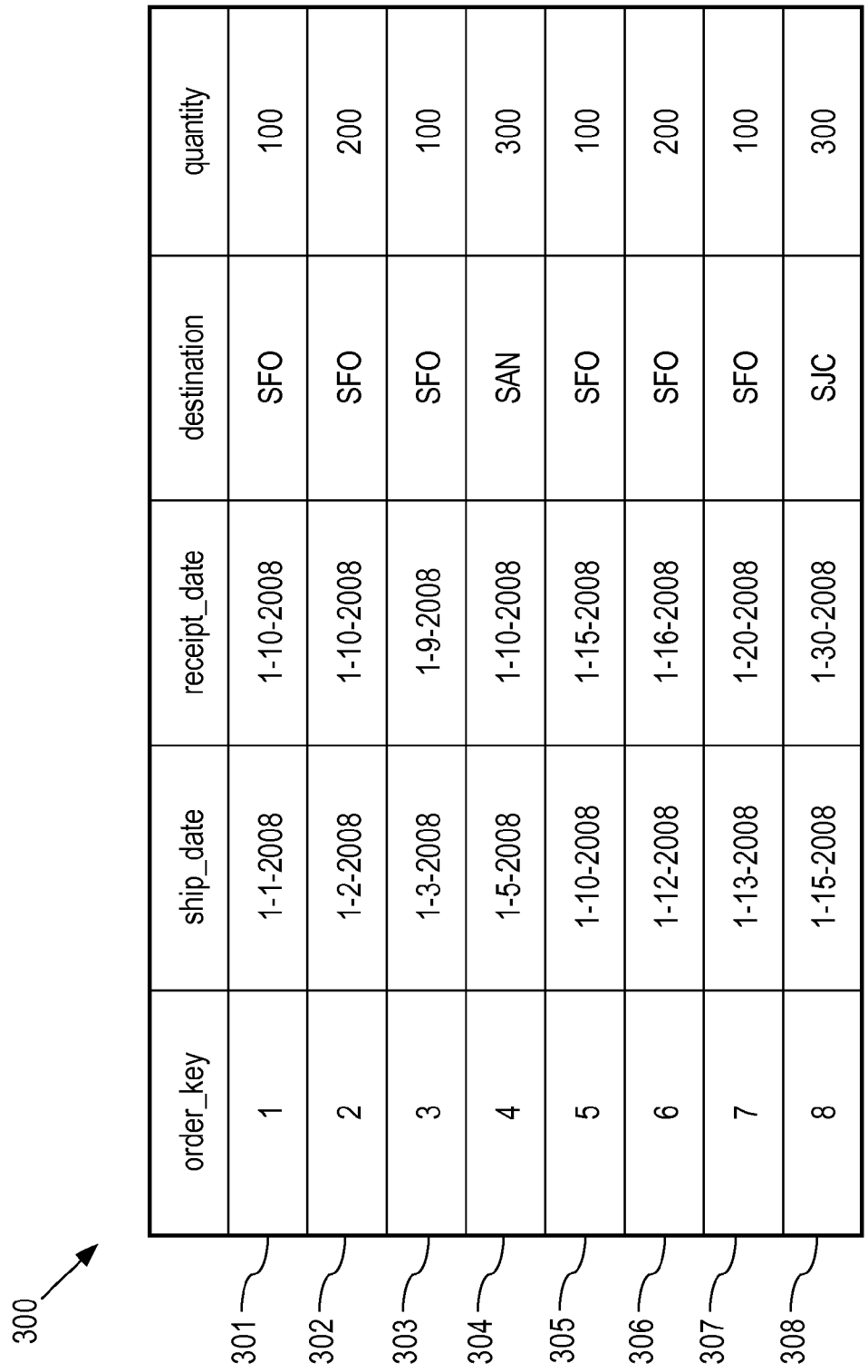
FIG. 3 illustrates an example database table.

As an example of using a zone map to facilitate zone pruning in a DBMS, consider the database table 300 of FIG. 3. The table 300 has five columns named order_key, ship_date, receipt_date, destination, and quantity. The table 300 has eight rows labeled 301-308 in FIG. 3. A practical embodiment may have many more rows numbering in the millions, billions, or more.

Figure 4:
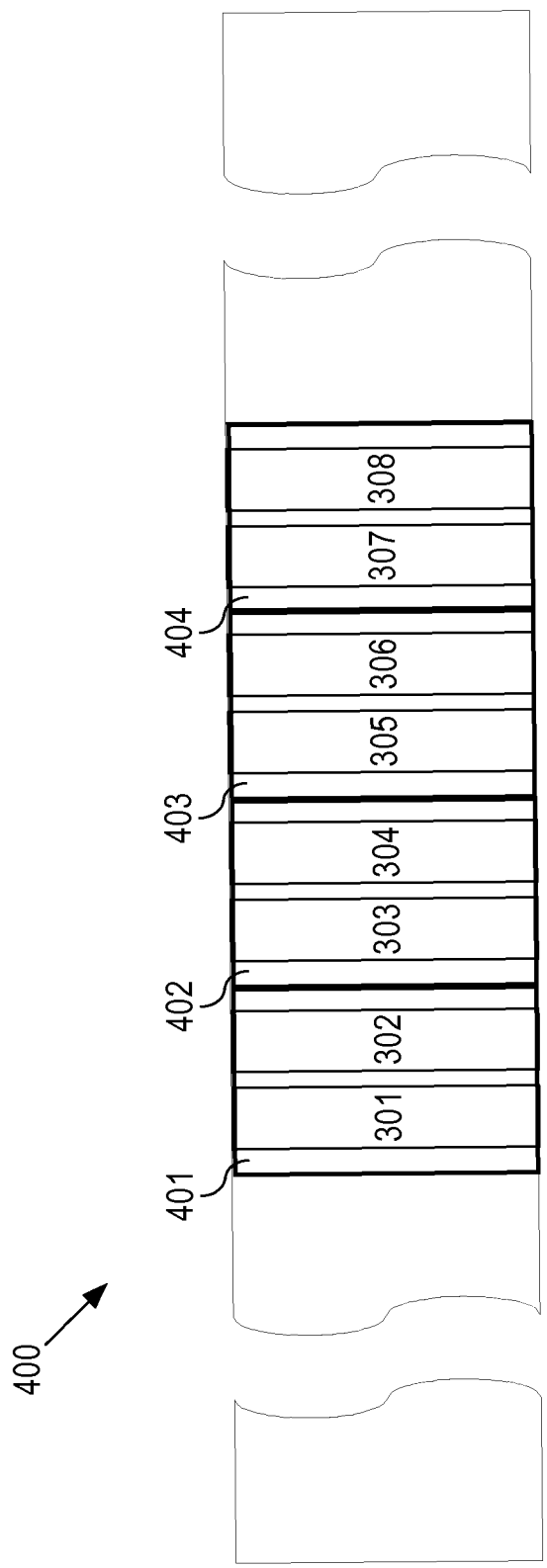
FIG. 4 is a block diagram example of a portion of a disk containing disk blocks, according to some embodiments of the present invention.

Referring now to FIG. 4, it illustrates how the rows 301-308 of table 300 may be stored on a portion of a disk 400 in a sorted order in contiguous disk blocks 401-404. The disk portion 400 may correspond to an extent, a segment, a database file, or other logical portion of a disk. The disk portion 400 is viewed logically by the database server as a set of separately addressable disk blocks arranged contiguously in a linear order. The disk blocks of the disk portion 400 are numbered consecutively according to their linear order by the database server.

In this example, rows 301-308 of table 300 are clustered based on the values of the ship_date column. In particular, rows 301 and 302 are stored in disk block 401, rows 303 and 304 are stored in disk block 402, rows 305 and 306 are stored in disk block 403, and rows 307 and 308 are stored in disk block 404. A practical embodiment may have more or less rows per disk block and/or have a different number of rows per disk block or have disk blocks within the table that contain different numbers of disk blocks. Further, the rows of a table may be stored in many more disk blocks numbering in the tens, hundreds, thousands, millions, or more. Further still, a disk block may store rows from more than one table.

A zone map for a table may be constructed in which each zone consists of a number of disk blocks. The maximum number of disk blocks per zone is referred to as the "scale" of the zone map. In some embodiments, the scale of a zone map is 1,024 but may be more or fewer according to the requirements of the particular implementation at hand. In addition, the zone map scale may be a user configurable parameter. Generally, the scale is a tradeoff between minimizing the number of zones per zone map, where the zone map scale is relatively large, and maximizing zone pruning efficiency, where the zone map scale is relatively small.

Figure 5:
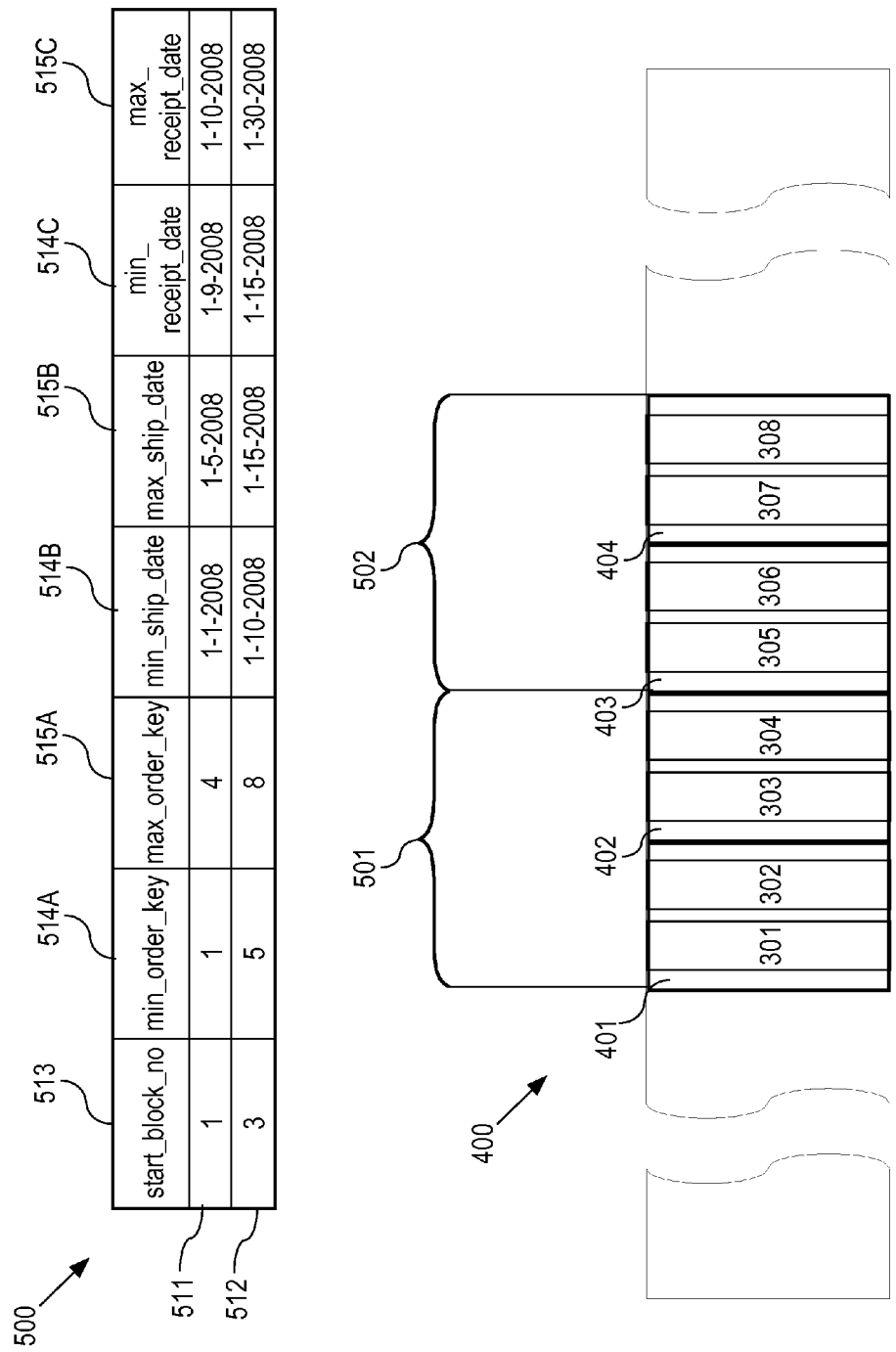
FIG. 5 is a block diagram example of a grouping contiguous disk blocks into zones using a zone map, according to some embodiments of the present invention.

Turning now to FIG. 5, it illustrates a zone map 500 on table 300 of FIG. 3. The zone map 500 may be represented as a table, materialized view, or other database object and may be stored in a database as such. In this example, for ease of illustration, the zone map scale is 2. In a practical embodiment, the zone map scale may be 1,024, for example. Continuing the current example, the four disk blocks 401-404 of FIG. 4 are divided in two zones 501 and 502 as shown in FIG. 5. Each zone 501 and 502 contains two contiguous disk blocks. In particular, zone 501 contains contiguous disk blocks 401 and 402 and zone 502 contains contiguous disk blocks 403 and 404.

Each row 511 and 512 of zone map 500 corresponds to a zone of the zone map. In particular, row 511 corresponds to zone 501 and row 512 corresponds to zone 502. The zone map 500 includes a zone disk block range column 513 specifying, for each zone, the first block in the set of contiguous disk blocks covered by the zone. More generally, the column indicates or specifies the range of contiguous disk blocks covered by a zone, for each zone of the zone map.

For example, assuming disk blocks 401-404 are consecutively numbered by the DBMS as 1, 2, 3, and 4, respectively, the values in the column 513 indicate that zone 501 covers contiguous disk blocks 401 and 402 and that zone 502 covers contiguous disk blocks 403 and 404. The columns of the zone map 500 also include a minimum value column 514 and a maximum value column 515 for each of the zoned columns on which the zone map 500 is constructed.

Based on zone map 500 and given the following query with a filter predicate on the ship_date column of table 300 of FIG. 3 with a filter predicate date value of '01-01-2008', a DBMS performing a table scan of table 300 can skip a scan of the zone 502 and disk blocks 403 and 404 because zone 502, based on the minimum and maximum values stored in columns 514B and 515B in row 512 of the zone map 500, cannot contain rows relevant to the following query.

SELECT*FROM lineitem WHERE ship_date='01-01-2008'

System Components

Figure 6:
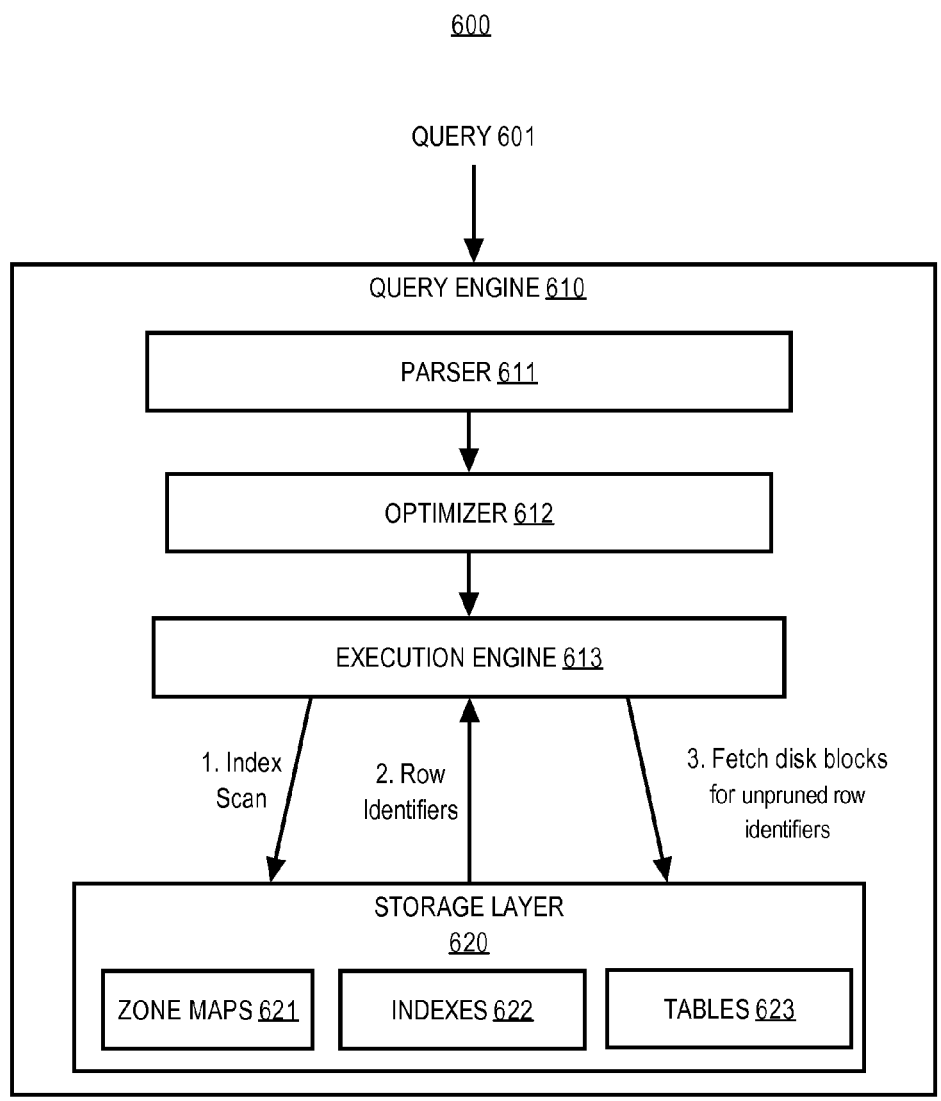
FIG. 6 is a block diagram example illustrating an environment in which some embodiments the present invention may be implemented.

FIG. 6 is a block diagram illustrating an environment 600 in which embodiments of the present invention may be embodied. Environment includes query engine 610. Query engine 610 provides mechanisms for using zone map information for post index access pruning. As shown in FIG. 6, query engine 610 includes as core components a parser 611, an optimizer 612, an execution engine 613, and a storage layer 620.

At a high level, parser 611 provides parse time functionality that transforms each query into a parse tree. Such transformation may include normalizing the parse tree. The normalized query tree representation is then sent to optimizer 612 which generates a physical query plan (execution plan) for execution of the query. The query plan is then provided to execution engine 613 which interprets the query plan and executes it with the support of storage layer 620.

The query plan generated by optimizer 612 may reflect a decision to perform post index access filtering using zone map information. In particular, after comparing cost of different access plans for a given query, optimizer 612 may generate a query plan that includes an index scan, followed by post index row identifier pruning based on zone map information, followed by a fetch of disk blocks corresponding to unpruned row identifiers. In making this decision, the optimizer 612 may factor in estimated disk I/O savings realized by post index row identifier pruning using zone map information.

In executing the query plan, as shown in FIG. 6, execution engine 613 interfaces with storage layer 620. In particular, execution engine 613 conducts an index scan on an index in indexes 622 and obtains a set of row identifiers as a result.

The returned set of row identifiers are pruned using zone map information according to the query plan being executed. The execution engine 613 fetches disk blocks corresponding to unpruned row identifiers from storage layer 620. Storage layer 620 may maintain an in-memory disk cache of recently accessed disk blocks. If a disk block fetched by execution engine 613 is in the cache, then the storage layer 620 can provide the requested disk block to the execution engine 613 without having to read the disk block from disk. If the disk block is not in the cache, then the storage layer 620 fulfills the fetch request by reading the requested disk block from disk. Even where a disk block cache is used in the storage layer 620 to cache disk blocks, the use of zone map information to prune row identifiers returned from an index scan can provide significant disk I/O savings, especially where the number of row identifiers returned by the index scan is large such that a significant number of the disk blocks corresponding to the returned row identifiers are not likely to be in the cache when fetched by execution engine 613. It should be noted that even if many or all disk blocks corresponding to returned row identifiers are cached, the use of zone map information for row identifier pruning can provide significant processing (CPU) costs by avoiding unnecessary disk block fetches from the cache.

A row identifier returned as a result of an index scan can indicate the physical disk location or address at which the identified row is stored. In this description, the term "physical disk location", "physical disk address", "physical address", and "physical location" refer to a location on disk such as a location on a hard disk, a solid state drive, or other non-volatile or persistent data storage medium. For example, a row identifier can be ten (10) bytes of data that specifies the physical address of the row, down to the specific disk block in which the row is stored and the location of the row within the disk block. To determine whether a row identified by a row identifier is or is not stored in a particular zone of a zone map, disk block identifying information in the row identifier can be compared to disk block identifying information in the zone map. The disk block identifying information in the zone map may specify, for each zone of the zone map, the range of contiguous disk blocks covered by the zone. If the disk block identified by the row identifier is in the disk block range of a zone, then the identified row is stored in the zone. If not in the disk block range, then the row is not stored in the zone. For example, referring to zone map 500 of FIG. 5 that is built on the order_key, ship_date, and receipt_date columns of table 300 of FIG. 3, disk block identifying information in a row identifier of a row in table 300 can be compared to the values in the start_block_no column of zone map 500 to determine which zone 501 or 502, if any, the row is stored in on disk. For example, if the disk block identifying information in the row identifier specifies that the row is stored in disk block 2, then it can be determined by comparing the value 2 to the values in the start_block_no column that the row is stored in zone 501 and not stored in zone 502. Thus, disk block identifying information in a row identifier for a row returned as a result of an index scan and disk block identifying information for zones in a zone map can be compared to determine whether the identified row is stored in one of the zones of the zone map.

As shown in FIG. 6, zone maps 621, indexes 622, and tables 623 are maintained in storage layer 620. A table 623 represents table data (rows) of the table as stored on disk. Data of a table may be clustered on-disk in contiguous data blocks, in a linear order or according to a space-filling curve order, based on the values of one or more columns of the table and/or the values of one or more columns of one or more other tables. A zone map 621 may be constructed on the clustered table data for one or more columns of the table and/or for one or more columns of one or more other tables. In addition, the values of one or more columns of the table may be indexed in an index 622. The index may be a B-tree index or a bitmap index, for example.

Sample Operation

The following description presents method steps that may be implemented using processor-executable instructions, for directing operation of a device under processor control. The processor-executable instructions may be stored on a non-transitory computer-readable medium, such as CD, DVD, hard disk, flash memory, or the like. The processor-executable instructions may also be stored as a set of downloadable processor-executable instructions, for example, for downloading and installation from an Internet location (e.g., a Web site).

The operations of some embodiments of the present invention may be illustrated by example which describes the processing of a particular SQL query. For purposes of this discussion, the following example SQL query is used:

SELECT SUM(quantity_sold) FROM sales WHERE (cust_id=1000) AND (order_date BETWEEN '2013-11-01' AND '2013-11-30')

Figure 7:
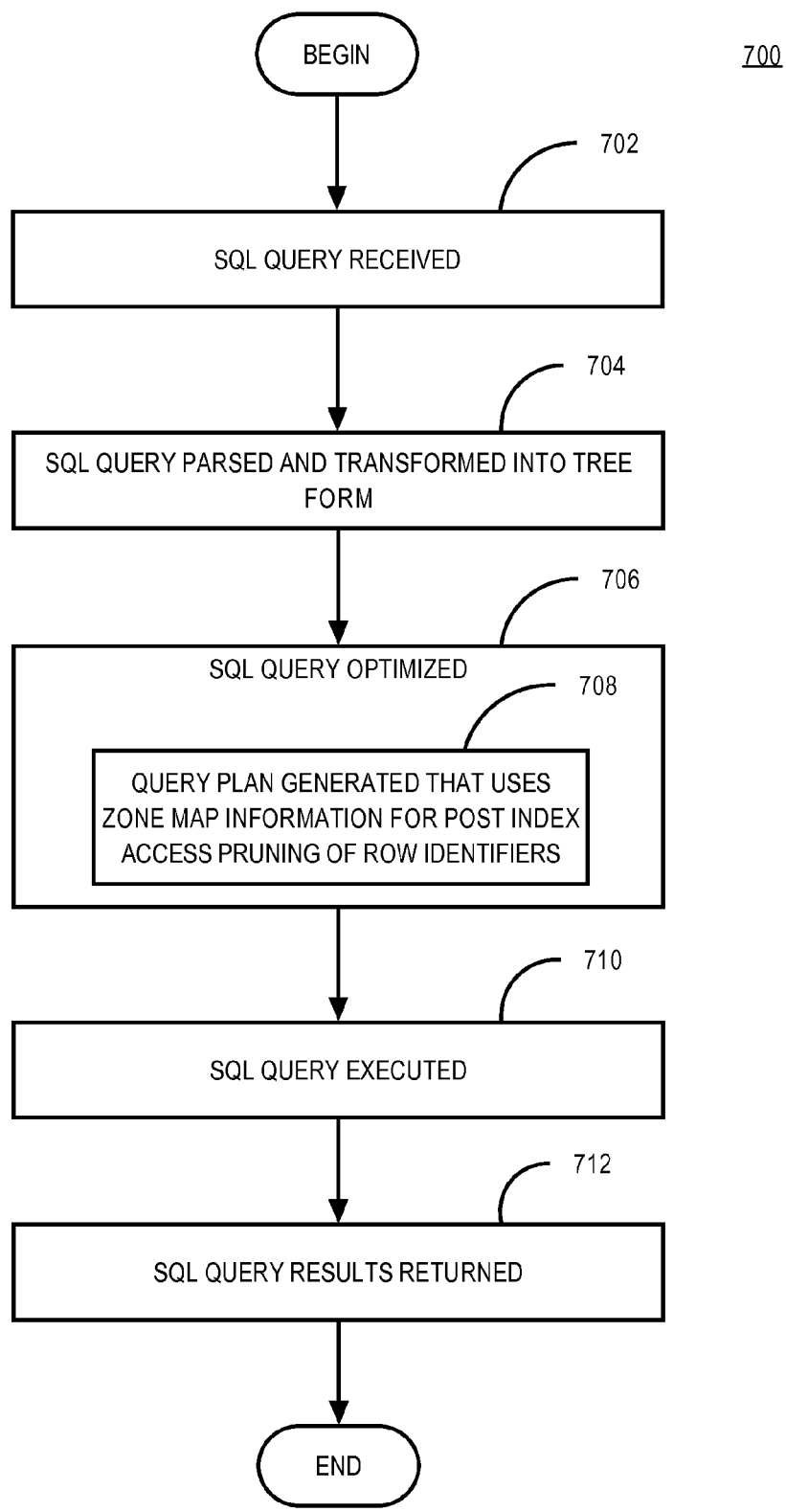
FIG. 7 comprises a flowchart illustrating the high level method steps of operation of some embodiments of the present invention in using zone map information for post index access pruning of row identifiers.

FIG. 7 comprises a flowchart 700 illustrating the high level method steps of operation of some embodiments of the present invention in using zone map information for post index access pruning of row identifiers.

At step 702, the SQL query is received. The above SQL query may, for instance, be received by the query engine of some embodiments of the present invention from a querier (e.g., a user or a computer application).

At step 704, the SQL query is parsed and transformed into tree form corresponding to the query. Step 904 may also involve normalizing the query tree into a normalized query tree form. Step 904 may involve checking the SQL query for correct syntax and performing a semantic analysis. For example, step 904 may involve verifying that database objects and object attributes referenced in the SQL query are correct.

At step 706, the most efficient way of producing the result of the SQL query is determined. The output of step 706 is a query execution plan that describes an optimum method of executing the SQL query. This optimization can include, among other things, evaluation of expressions and conditions in the SQL query and choosing access paths for obtaining table data.

As shown in FIG. 7, step 706 may include step 708 which includes generating a query plan the uses zone map information for post index access pruning of row identifiers. For example, at step 706, it may be determined that the most efficient way of to execute the above query is to perform an index scan of an index on the cust_id column to determine the identifiers of rows that satisfy the equality predicate on the cust_id column, followed by using zone map information for the order_date column from a zone map built for the sales table to prune row identifiers returned from the index scan that identify rows that cannot possibly satisfy the BETWEEN predicate on the order_date column, followed by fetching disk blocks corresponding to the remaining unpruned row identifiers to determine rows that satisfy the equality predicate on the cust_id column that also satisfy the BETWEEN predicate on the order_date column.

At step 710, the output execution plan associated with the SQL query is operated on and the results therefrom returned to the querier at step 712.

Sample Detailed Operation

Queries for which using zone map information for post index access pruning of row identifiers is possible include those that contain at least one filter predicate on an indexed column and at least one filter predicate on a zoned column. For example, in the above query, assuming a zone map has been constructed on the order_date column of the sales table and an index built on the cust_id column of the sales table, then the filter predicate on an indexed column is the equality predicate on the cust_id column and the filter predicate on a zoned column is the BETWEEN predicate on the order_date column.

Figure 8:
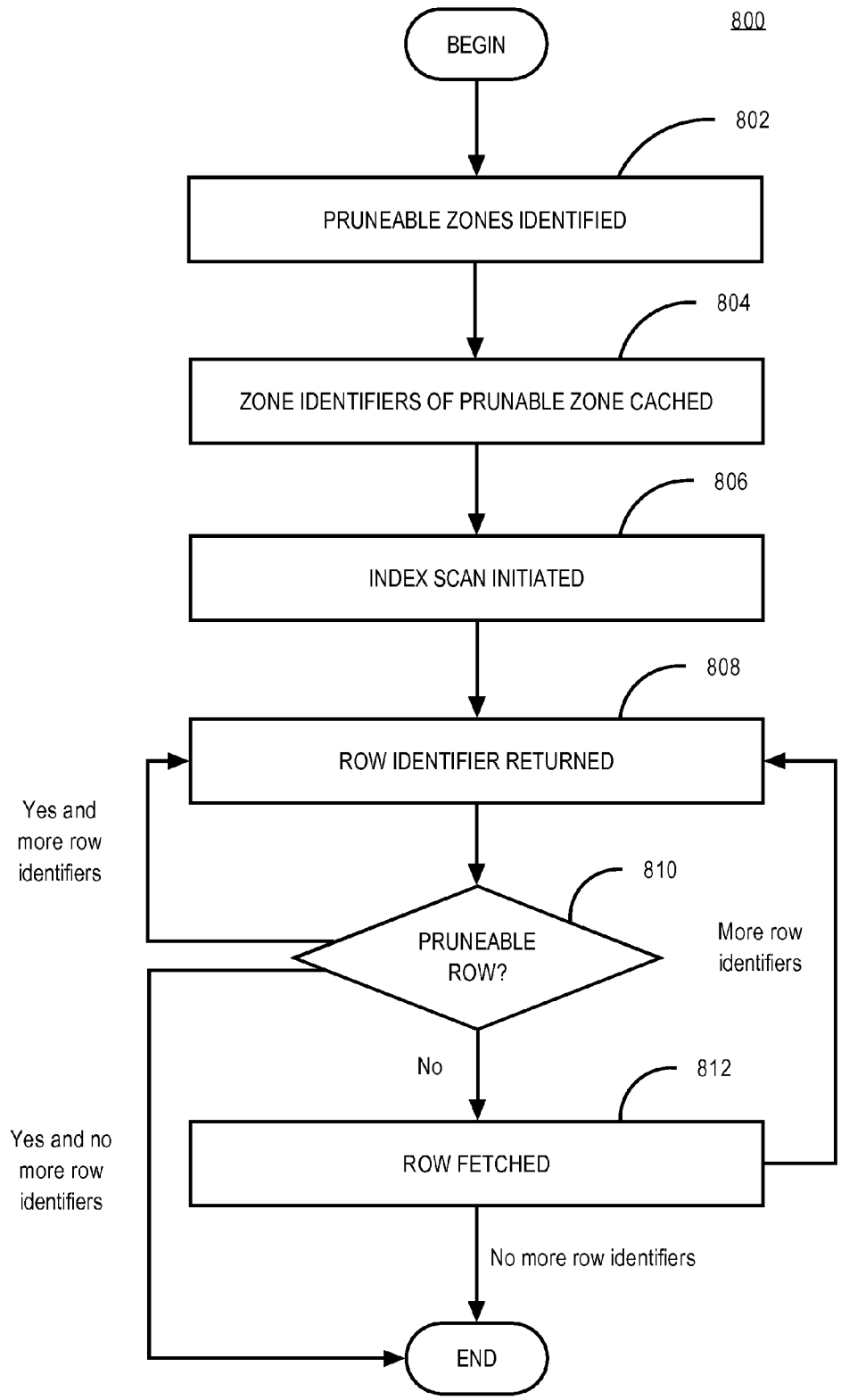
FIG. 8 comprises a flowchart illustrating lower level method steps of operation of some embodiments of the present invention in using zone map information for post index access pruning of row identifiers.

FIG. 8 comprises a flowchart 800 illustrating lower level method steps of operation of some embodiments of the present invention in using zone map information for post index access pruning of row identifiers. In particular, the steps may be performed by a query engine after it has been determined by the query engine optimizer that the most efficient query plan for executing a query with at least one filter predicate on an indexed column and at least one filter predicate on a zoned column is to use zone map information for post index access pruning of row identifiers returned from an index scan.

At step 802, zones of the zone map that cannot contain rows that satisfy the predicate on the zoned column in the query are determined. In other words, zones of the zone map that are pruneable are determined step 802. This determination can be made by querying the zone map for zones whose associated min and max value range for the zoned column in the zone map does not overlap, even partially, the range of the value in the filter predicate for the zoned column in the query. For example, in the above query, any zone in the zone map for the sales table whose associated min and max value range for the order_date column in the zone map does not overlap, even partially, the value range BETWEEN '2013-11-01' AND '2013-11-30' is a zone that is pruneable because it cannot contain rows that satisfy the BETWEEN predicate on the order_date column. Each such determined zone may be identified by a zone identifier as stored in the zone map. Where there are multiple filter predicates in the query on multiple zoned columns of the zone map, a zone can be determined to be pruneable at step 802 if the zone's min/max value range for any one of the zoned columns does not overlap, even partially, the range of the value in the filter predicate on the one zoned column.

In this case, step 802 determines a zone to be pruneable if one of the min/max range does not overlap, even partially, the range of the value in the filter predicate for the corresponding zoned column in the query filter predicate.

At step 804, the set of zones in the zone map identified as pruneable at step 802 is cached in memory for subsequent efficient access. For example, zone identifiers may be stored in an associative array with the keys of the array being zone identifiers and the values being a Boolean value indicating whether the corresponding zone is pruneable as determined in step 802.

At step 806, an index scan of the index on the indexed column is initiated based on the value of the filter predicate on the indexed column in the query. For example, with the above query, at step 806, an index scan of the index on the cust_id column of the sales table is initiated for all rows of the sales table where the value of the cust_id column according to the index equals 1000.

At step 808, a row identifier is returned from the index scan initiated at step 806 that identifies a row that satisfies the filter predicate on the indexed column in the query. In some embodiments, row identifiers returned from the index scan are returned as a stream or sequence of row identifiers. In this case, step 808 may correspond to a row identifier returned in the stream of row identifiers. More generally, a row identifier may be returned from the index scan in step 808 before all row identifiers have been returned from the index scan. Thus, each row identifier returned from the index scan may be processed in steps 808, 810, or 812 after it is returned and before a next or subsequent row identifier is returned.

At step 810, it is determined whether the row identified by the row identifier returned at step 808 is pruneable. This determination involves attempting to map the row identifier to a zone in the zone map using disk block identifying information in the row identifier and disk block range identifying information for zones in the zone map. In particular, the zone map can be queried for the zone identifier of a distinct zone, if there is one, in which the disk block identified in the row identifier is within the range of disk blocks covered by the zone. Since each row of a zoned table is stored in at most one zone, there can be at most one zone in which a row identified by a row identifier is stored. Once the zone identifier of the zone in which the row identified by a row identifier is obtained, the information cached at step 804 is consulted to determine whether the row is pruneable. If the row is pruneable, then the disk block containing the row data need not be fetched from disk or the cache because the row cannot be an answer to the query because it cannot satisfy the filter predicate on the zoned column in the query. The process then returns to step 808 if there are more row identifiers returned from the index scan or ends if all row identifiers returned from the index scan have been considered for pruning.

At step 812, if the row identified by the row identifier is not pruneable at step 810, then the disk block storing the row is fetched (read) from disk, or from the cache if the disk block has been cached. The row data in the fetched disk block is then compared to the value of the filter predicate on the zoned column in the query to determine whether the row can satisfy the query. The process then returns to step 808 if there are more row identifiers returned from the index scan or ends if all row identifiers returned from the index scan have been considered for pruning.

It should be noted that the above process can be used where there are multiple filter predicates on indexed columns in the query. In this case, steps 806 through 812 may be performed for each such filter predicate.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for using zone map information for post index access pruning comprising:
   receiving a query statement comprising a first filter predicate on an indexed column of a first database table and a second filter predicate on a zoned column of a second database table;
   identifying one or more pruneable zones of a zone map based on a value for the zoned column in the second filter predicate;

wherein the zone map comprises a plurality of zones corresponding to a plurality of contiguous regions of disk blocks;

wherein, for each zone of the plurality of zones, the zone map stores a minimum column value for the zoned column for the zone and a maximum column value for the zoned column for the zone;

obtaining a set of data record addresses from an index on the indexed column based on a value for the indexed column in the first filter predicate; and pruning, from access paths for processing the query statement, any data records, corresponding to data record addresses in the set of data record addresses, that are physically located in one of the one or more pruneable zones.

2. The method of claim 1, wherein each of the data record addresses in the set of data record address is a row identifier.

3. The method of claim 1, wherein each of the data record addresses in the set of data record addresses comprises information identifying a physical location of the corresponding data record.

4. The method of claim 1, wherein the indexed column and the zoned column are columns of the same database table.

5. The method of claim 1, wherein the indexed column is a column of a fact table in a star schema and the zoned column is a column of a dimension table in the star schema.

6. The method of claim 1, wherein the set of data record addresses are obtained from the index as a stream of data record addresses; and wherein the method further comprises:

processing the stream of data record addresses including, for each data record address in the set of data record addresses, determining whether the data record corresponding to the data record address is physically located within one of the one or more pruneable zones, and pruning the corresponding data record from access paths for processing the query statement depending on whether the corresponding data record is physically located within one of the one or more pruneable zones.

7. The method of claim 1, wherein the index on the indexed column is a B-tree index or a bitmap index.

8. The method of claim 1, wherein the second filter predicate is an equality predicate, an inequality predicate, a range predicate, a like predicate with a constant prefix, or an in-list predicate.

9. The method of claim 1, further comprising:

fetching, from a cache or from disk, any data records, corresponding to data record addresses in the set of data record addresses, that are not physically located in any of the one or more pruneable zones.

10. The method of claim 1, wherein:

the zoned column is a first zoned column;

the query statement comprises a plurality of filter predicates on a zoned column, each on a different zoned column, the plurality of filter predicates comprising the second filter predicate on the first zoned column; and identifying the one or more pruneable zones of the zone map is based on the values for the different zoned columns in the plurality of filter predicates on a zoned column.

11. One or more non-transitory computer-readable media storing instructions which, when executed by one or more computing devices, causes the one or more computing devices to perform steps for using zone map information for post index access pruning comprising:

receiving a query statement comprising a first filter predicate on an indexed column of a first database table and a second filter predicate on a zoned column of a second database table;

identifying one or more pruneable zones of a zone map based on a value for the zoned column in the second filter predicate;

wherein the zone map comprises a plurality of zones corresponding to a plurality of contiguous regions of disk blocks;

wherein, for each zone of the plurality of zones, the zone map stores a minimum column value for the zoned column for the zone and a maximum column value for the zoned column for the zone;

obtaining a set of data record addresses from an index on the indexed column based on a value for the indexed column in the first filter predicate; and pruning, from access paths for processing the query statement, any data records, corresponding to data record addresses in the set of data record addresses, that are physically located in one of the one or more pruneable zones.

12. The one or more non-transitory computer-readable media of claim 11, wherein each of the data record addresses in the set of data record address is a row identifier.

13. The one or more non-transitory computer-readable media of claim 11, wherein each of the data record addresses in the set of data record addresses comprises information identifying a physical location of the corresponding data record.

14. The one or more non-transitory computer-readable media of claim 11, wherein the indexed column and the zoned column are columns of the same database table.

15. The one or more non-transitory computer-readable media of claim 11, wherein the indexed column is a column of a fact table in a star schema and the zoned column is a column of a dimension table in the star schema.

16. The one or more non-transitory computer-readable media of claim 11, wherein the set of data record addresses are obtained from the index as a stream of data record addresses; and wherein the steps further comprise:

processing the stream of data record addresses including, for each data record address in the set of data record addresses, determining whether the data record corresponding to the data record address is physically located within one of the one or more pruneable zones, and pruning the corresponding data record from access paths for processing the query statement depending on whether the corresponding data record is physically located within one of the one or more pruneable zones.

17. The one or more non-transitory computer-readable media of claim 11, wherein the index on the indexed column is a B-tree index or a bitmap index.

18. The one or more non-transitory computer-readable media of claim 11, wherein the second filter predicate is an equality predicate, an inequality predicate, a range predicate, a like predicate with a constant prefix, or an in-list predicate.

19. The one or more non-transitory computer-readable media of claim 11, the steps further comprising:

fetching, from a cache or from disk, any data records, corresponding to data record addresses in the set of data record addresses, that are not physically located in any of the pruneable zones.

20. The one or more non-transitory computer-readable media of claim 11, wherein:
the zoned column is a first zoned column;
the query statement comprises a plurality of filter predicates on a zoned column, each on a different zoned column, the plurality of filter predicates comprising the second filter predicate on the first zoned column; and
the step of identifying the one or more pruneable zones of the zone map is based on the values for the different zoned columns in the plurality of filter predicates on a zoned column.

21. A method for using zone map information for post index access pruning comprising:
receiving a query statement comprising a first filter predicate on a first column of a database table and a second filter predicate on a second column of the table;
querying a zone map for any zones of the zone map that cannot possibly contain rows of the table that satisfy the second filter predicate, wherein querying the zone map returns identifiers of one or more zones of the zone map that cannot possibly contain rows of the table that satisfy the second filter predicate;
wherein the zone map comprises a plurality of zones corresponding to a plurality of contiguous regions of disk blocks;
wherein, for each zone of the plurality of zones, the zone map stores a minimum column value for the second column for the zone and a maximum column value for the second column for the zone;
storing the one or more returned zone identifiers in a memory;
responsive to initiating an index scan of an index on the first column for rows of the table that satisfy the first filter predicate, receiving row identifiers of one or more rows of the table that satisfy the first filter predicate; and
for each row identifier of the one or more rows of the table that satisfy the first filter predicate:
determining, based at least in part on at least a portion of the row identifier and the zone identifiers stored in memory, whether the row identified by the row identifier is physically located in one of the one or more identified zones of the zone map that cannot possibly contain rows of the table that satisfy the second filter predicate,
if the row identified by the row identifier is physically located in one of the one or more identified zones of the zone map that cannot possibly contain rows of the table that satisfy the second filter predicate, then discarding the row identifier, and
if the row identified by the row identifier is not physically located in one of the one or more identified zones of the zone map that cannot possibly contain rows of the table that satisfy the second filter predicate, then fetching the row from a cache or a physical location on disk.

22. The method of claim 21, wherein the portion of the row identifier identifies a physical location on disk where the corresponding row is stored.

23. The method of claim 21, wherein the zone map comprises, for each zone of the plurality of zones of the zone map, information identifying a contiguous portion of physical disk covered by the zone.

* * * * *

UNITED STATES PATENT AND TRADEMARK OFFICE
CERTIFICATE OF CORRECTION

PATENT NO.         : 9,514,187 B2
APPLICATION NO.    : 14/245934
DATED              : December 6, 2016
INVENTOR(S)        : Ziauddin It is certified that error appears in the above-identified patent and that said Letters Patent is hereby corrected as shown below:

On the Title Page

On page 2, Column 2, item (56) under Other Publications, Line 10, delete "Netzza" and insert -- Netezza --, therefor.

On page 3, Column 2, item (56) under Other Publications, Line 6, delete ""Fundatmentals" and insert -- "Fundamentals --, therefor.

On page 3, Column 2, item (56) under Other Publications, Line 10, delete "Brirningham," and insert -- Birmingham, --, therefor.

In the Specification

In Column 13, Line 52, after "in" delete "on".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*